Feb. 8, 1966 M. BELTZER ET AL 3,234,050
FUEL CELL
Filed Jan. 2, 1962

Morton Beltzer
Carl E. Heath, Jr.      INVENTORS
Barry L. Tarmy
BY  Olin B. Johnson
                        PATENT ATTORNEY

3,234,050
FUEL CELL
Morton Beltzer, New York, N.Y., and Carl E. Heath, Jr., and Barry L. Tarmy, Berkeley Heights, N.J., assignors to Esso Research and Engineering Company, a corporation of Delaware
Filed Jan. 2, 1962, Ser. No. 163,752
12 Claims. (Cl. 136—86)

This invention is a continuation-in-part of application Serial No. 114,088, filed June 1, 1961, now abandoned.

This invention relates to electrochemical cells and to components thereof. In particular, this invention relates to novel fuel cells and eletcrolytic cells, to components thereof and to processes for the operation of such cells. More particularly, it relates to cells employing components comprising a relatively non-conductive substrate at least one major surface on which is sorbed a flexible layer of metal formed in situ thereon.

The use of ion-exchange resin membrances as fuel cell electrolytes is known to the art. One object in employing such materials is to obtain a fuel cell having a large volumetric yield, i.e. to provide an effective cell occupying as little space as possible. In the first efforts to prepare a cell of this type the membrane was positioned between conventional diffusion electrodes, e.g. porous carbon or metal plates. Aside from the space requirements of the conventional electrodes, a cell so prepared is limited in operating temperature to the temperature tolerance limits of the membrane employed. Many of the more desirable membranes available for such purpose begin to shrink at relatively low temperatures resulting in a rapid loss of porosity and a reduction of area of contact between such membrane and the electrodes with which it is associated. One method heretofore employed for reducing the size of a cell of this type has been to physically impress finely divided metal powders or fine mesh metal sieves into a surface of a partially polymerized resin or into a material wherein a completely polymerized resin is found in a thermal plastic resin matrix. In other embodiments a thermal plastic binder has been employed to cause the metal particles to adhere to a membrane surface. Electrodes prepared by the methods described are subject to certain deficiencies. A continuous layer of conducting material essential to the transmission of electrons to or from all parts of the coated surface is difficult to achieve and even more difficult to maintain when such conduction is to be effected solely through physical contact of a large number of particulate solids. Furthermore, when metallic powders are impressed into a soft spongy or partially polymerized membrane material control of pore clogging becomes a problem. Discontinuous particulate solids although phyically adhered to the surface provide little control of membrane distortion. Metallic grids offer some support for imprinted metal powders but this is usually achieved at the cost of reducing flexibility of the membrane-metal combination.

It has now been discovered that highly effective novel fuel cell components may be prepared by uniting a thin, continuous, uniform layer of silver or nickel to a surface of a suitable solid material, which may be an organic membrane, having ion-exchange groups chemically bonded to an organic compound which is chemically and/or physically bonded to said surface. The process is carried out by contacting said surface with a solution containing gold, silver, platinum, and palladium ions thereby displacing a hydrogen atom of said ion-exchange groups and forming the corresponding metal salt by the chemical union of said ion-exchange groups, contacting the thus formed metal salt with a reducing agent thereby converting the metallic component of said salt to the corresponding elemental metal, thus providing tightly held catalyst sites, and contacting the resulting metal comprising surface with a solution containing silver or nickel ions and a reducing agent for such ions.

In this process the ion-exchange groups preferably have uniformity of distribution and preferably are present in the highest possible concentration per unit of area. The time required to obtain a continuous coating and the ability to obtain a continuous coating of the least possible thickness will depend primarily upon such distribution and concentration. Aside from the other advantages hereinafter discussed, this catalyst fixing feature of the instant process accords advantages unattainable by any method of indiscriminate "seeding" of a surface with metal of the reduction of a free or floating solution of metal salts.

It is within the scope of this invention to employ as the substrate to be coated or plated a material preformed with such ion-exchange groups an integral part of its molecular structure, e.g. the ion-exchange resin membranes and the ion-exchange interpolymer membranes hereinafter discussed in detail. Also where a material does not possess such ion-exchange groups integrally bound to its complete and original structure, such groups may be added where such material is capable of undergoing conventional chemical reactions with a reactant that will chemically bond such groups to its external and/or internal surfaces, e.g. the addition of —$SO_3H$ groups to a polystyrene resin by conventional sulfonation or hydroxylation of suitable polymeric materials. In the alternative, the groups may be added by contacting the surface to be coated with a dye the molecular structure of which leaves exposed on the surface thereof ion-exchange groups of the same type as those found upon the surfaces of cation-exchange membranes, e.g. —$SO_3H$, —COOH, —OH.

Thus, in accordance with the instant process, a distribution of catalyst is first effected upon an external surface bearing fixed ion-exchange groups by contacting the surface with a solution containing the desired metal ion, i.e. a metal ion that will catalyze the reduction of silver or nickel in the presence of a reducing agent, such as hydroquinone, etc. Where the material to be coated already possesses ion-exchange groups on the surface, the initial step of the process comprises contacting the ion-exchange surface with an aqueous solution containing ions of one or more of these metals, e.g. an aqueous solution of a salt of such metals, such as the nitrate, a soluble halide, etc. When this solution is brought into contact with a cation-exchange membrane, or any surface having equivalent functional groups exposed on a surface thereof, a substitution reaction occurs wherein a metallic ion from the solution replaces one or more hydrogen atoms of a fixed ionic group on the surface, e.g. an —$SO_3H$ group so as to chemically bond the metal ion to the surface by formation of the corresponding metal salt as a part of said surface. The cation of the metal salt, i.e. the metal ion, is then reduced in situ to the elemental metal by contact with a reducing agent, such as hydroquinone, pyrogallol, catechol, hydroxylamine, p-phenylenediamine, p-aminophenol, ferrous oxalate, etc.

For purposes of clarity the embodiments involving silver plating will be discussed separately followed by a discussion of nickel plating in accordance with this process. Gold, silver, platinum and palladium catalyze the reduction of silver ion in the presence of a suitable reducing agent, e.g. any reducing agent suitable for use as a photographic developer. Once the initial dispersal of catalytic amounts of gold, silver, platinum or palladium or mixtures of any of these metals is present on the surface to be coated in elemental form, a continuous layer of silver may be laid down upon the membrane surface by contacting the surface with silver ion in the presence of a suitable reducing agent. The catalysis of silver ion reduction by these metals is well known in the art. See, for example, T. H. James, J. Am. Chem. Soc., 61, 648 (1939); H. V. Euler, Z. Elektrochem., 28, 446 (1922); T. H. James, J. Am. Chem. Soc., 62, 3411 (1940); T. J. James, J. Phys. Chem., 45, 223 (1941); M. Proskurnin & A. Frumkin, Z. Physik, Chem., 155A 29 (1931); V. I. Veselovsky, Acta. Physicochim. U.S.S.R. 11, 815 (1939); Kh. S. Bagdasar'yan J. Phys. Chem. U.S.S.R., 17, 336 (1943); Kh. S. Bagdasar'yan, Acta. Physicochim. U.R.S.A., 19, 421 (1944); T. H. James, J. Am. Chem. Soc., 64, 731 (1942); W. Reindeers and R. W. P. DeVries, Rec. Trav. Chim. 56, 985 (1937). The treating solution, including both silver ion and reducing agent, is preferably prepared just prior to use. Such a solution may be prepared by adding the reducing agent, e.g. hydroquinone, hydroxylamine, p-aminophenol, etc., to an aqueous solution containing silver ion, e.g. aqueous $AgNO_3$. The silver that is deposited is derived from the solution and is deposited on the previously deposited catalytic sites where silver, platinum, palladium or gold was converted from the corresponding salt to the elemental metal in situ upon the surface to be coated. If the initial deposit is platinum, palladium or gold, these metals will become coated with silver as the catalytic addition process proceeds so that the reaction changes, e.g. from a gold catalyzed to a silver catalyzed silver ion reduction.

The thickness of the silver layer can be controlled by the number of times the catalytic reduction process is carried out, by varying the concentration of silver ion and reducing agent in the treating solution, by varying the time of contact of treating solution in a single treatment, varying temperature, and by controlling the pH of the reducing solution since the reaction rate increases with an increase of pH. Using these guides, one skilled in the art can, by the routine experimentation, control this process so as to lay down a silver surface of any desired thickness. It will generally be preferable to carry out the process at room temperature, however, temperatures above the freezing point and below the boiling point of the solution can be used.

Once a continuous layer of silver is formed on the membrane other materials can be electrodeposited upon the silver layer using the silver surfaced membrane as a cathode in a conventional electrodeposition cell having an electrolyte bath containing the desired metal ion, e.g. copper, the noble metals such as platinum, gold, iridium, rhodium, palladium, etc. as well as the transition metals, e.g. nickel, chromium, iron, cobalt, etc.

When ion-exchange sites are not present upon the surface as, for example, with glass, porous carbon, or a membrane formed solely from a material such as linear polystyrene and a non-ionic binder, or any membrane where it is desired to increase the surface density of such sites, the sites may be provided by applying to the surface a suitable dye prior to the initial contact with metal ions wherein the catalyst is laid down. For this purpose water soluble dyes are preferred and where the substrate contains minute pores such as a membrane and the aim is not to coat or block such pores, it is preferable that such dye be irreversibly adsorbed.

The use of ion-exchange dyes makes possible a better distribution and a higher concentration of ion-exchange groups upon the surface to be coated and the dye can be used on a surface which is either completely bare of ion-exchange groups or one which already contains such units in its molecular structure. For example, adsorption of a dye, such as Cochineal Red A, can provide four additional surface exchange sites per molecule, i.e. 3 sulfonic groups and 1 phenolic group. Other well known dyes which are useful for this purpose include Orange 1, Chromotrope 2R, Fast Red B or Bordeaux B, Crystal Ponceau 6R, Amaranth, Orange II, Methyl Orange, Trypan Blue or Diamine 3B, Trypan Red, Cotton Blue or Aniline Blue or Nicholson Blue, etc. The distribution of exchange groups upon the surface is therefore much more extensive and, in many cases, such groups are established where none existed previously. In the application of such dyes adsorption is due to nonspecific, coulombic attractive forces between the dye and the organic matrix of the membrane surface when the surface is then contacted with a solution of silver, gold, platinum or palladium salts, e.g. providing such ions as $Ag^+$, $Au(SCN)_2^-$, $AuCl_4^-$, $PtCl_6^=$, $PdCl_6^=$ etc., metal salts, e.g. sulfonate and phenolate salts, are formed on the surface having a greater continuity than is possible with untreated surfaces.

Thus, when the membrane is an anion-exchange membrane or is non-ionic, the metal surfacing hereinbefore described may be carried out with modifications of the surface. Such membrane can be dyed with one of the aforementioned dyes which leave $-SO_3H$, $-OH$, and/or $-COOH$ groups exposed on the membrane surface. After such groups are available, the catalytic reduction process can be carried out as previously described with cation-exchange membranes. In addition, an alternative process permits surfacing of strongly basic ion-exchange membranes, containing groups such as polyvinylamidazole which have been quaternized with methyliodide. These can be coated with silver by formation on the surface of a silver halide or silver hydroxide followed by reduction in situ of the salt which in turn is followed by catalytic reduction of silver ion. This modification differs chemically from the foregoing cation-exchange embodiments in that although a fixed ion-exchange group, e.g. $N^+R_4 \cdot I^-$ (where R is an alkyl group) causes the formation of the silver salt, the salt is formed with the replaceable ion. The previous embodiments are more easily carried out and hence are preferred. One variation that can be used is to convert the silver halide to the sulfide salt, since silver sulfide is also capable of catalytically reducing silver. Once the initial metal sites are formed on the surface, the same procedure of silver surfacing is carried out. This may be followed by metal exchange as hereinafter described, or coating as by electrodeposition of other metals on the silver surface or upon the metal used to displace silver. This may be followed by metal exchange as hereinafter described, or coating as by electrodeposition of other metals on the silver surface or upon the metal used to displace silver.

Gold, platinum, palladium and nickel catalyze the reduction of nickel ion in the presence of a suitable reducing agent. When the process is employed for nickel plating, the procedure aforedescribed for silver plating is followed with the following exceptions. The ions of gold, platinum or palladium are applied to the ion-exchange surface as previously described to establish the fixed catalyst sites. The catalyst fixed area is then contacted with an aqueous solution containing nickel ions and a strong reducing agent such as a hypophosphite salt, e.g. sodium or potassium hypophosphite. This embodiment is preferably carried out at temperatures above about 65° C.

The membranes employed as components for fuel cells or electrolytic cells in accordance with this invention may be cationic, anionic or non-ionic. In electrochemical cells they may be employed, when coated, as electrodes, electrolyte partitions and electrode-electrolyte combinations. These membranes may therefore include such represesntative types of membranes as ion-exchange resin membranes and non-ionic or ion-exchange interpolymer membranes.

Ion-exchange resin membranes, i.e. organic membranes, at least one component of which is a polyelectrolyte, are well known in the art. Such membranes include in their polymeric structure dissociable ionizable radicals at least one ionic component of which is fixed to or retained by a polymeric matrix with at least one ion component being a mobile and replaceable ion electrostatically associated with the first component. The ability of the mobile ion to be replaced under appropriate conditions by other ions imparts ion-exchange characteristics to these materials.

The best known of the ion-exchange membranes are the ion-exchange resin membranes which may be prepared by copolymerizing a mixture of ingredients one of which contains an ionogenic substituent. In the case of cationic-exchange resins, these groups are acidic groups, such as the sulfonic acid group, the carboxylic acid group, and the like. In the case of anion-exchange resins, the group is basic in nature and may comprise amine groups, ordinary ammonium groups, the guanidine group, the dicyandiamine group and other nitrogen-containing basic groups. In the case of these anion-exchange resins, the ionizable group is attached to a polymeric compound, such as phenol-formaldehyde resin, a polystyrene divinyl-benzene copolymer, a urea-formaldehyde resin, a melamine-formaldehyde resin, a polyalkylene-polyamine-formaldehyde resin, etc. Thus, typical cation resins may be prepared by copolymerizing a n-phenol sufonic acid with formaldehyde. A typical anion resin may be prepared by copolymerizing a mixture of phenol, formaldehyde and triethylene-tetramine. The preparation and properties of a number of different types of cation-exchange resins are described throughout the literature and in particular in "Ion Exchange," Nachod, Academic Press, Inc., New York (1950); "Ion Exchange Resins," Kunin & Myers, John Wiley & Sons, Inc., New York (1950); Styrene, Its Polymers and Copolymers and Derivatives," Boundy Boyer, Reinhold, New York (1950) and in various U.S. patents, e.g. Langer, 2,891,999 and 2,861,045; Bodamer, 2,681,319–20; D'Alelio, 2,366,007–8 and 2,663,-703; Hutchison 2,678,306; Ferris, 2,658,042, etc.

The formation of these ion-exchange resins into membrane or sheet form is well known in the art. In general these membranes are of two forms, the mosaic in which granules of ion-exchange resin are incorporated into a sheet-like matrix of a suitable binder, such as a binder of polyethylene or polyvinyl chloride, and the continuous ion-exchange resin membrane in which the entire membrane structure has ion-exchange characteristics. The latter type of membrane may be formed by molding or casting a partially polymerized ion-exchange resin into sheet form. The formation of these ion-exchange membranes is described, for example, in "Amberplex Ion Permeable Membranes," Rohm & Haas Co., Philadelphia (1952), and in the references mentioned in this publication.

The ion-exchange resin membranes above-described have heretofore been employed in fuel cells as electrolytes, electrolyte dividers, etc. and may be used in the practice of this invention. However, membranes of this type ordinarily have a relatively high internal electrolytic resistance and are therefore not as desirable for use in fuel cells as are the so-called interpolymer ion-exchange membranes.

An interpolymer membrane is one which is cast from a solution containing both a polymeric electrolyte or ionogenic material and a matrix polymer so as to form a film composed of these two intermeshed molecular species. A typical interpolymer membrane is made by dissolving linear polystyrene sulfonic acid and a copolymer of acrylonitrile and vinylchloride in N,N-dimethylformamide, casting the solution as a film and evaporating off the solvent. The type of polyelectrolyte used can range from the strong acid type as described above to those which are strong bases, such as quaternary polyvinylimidazolium hydroxides. Membranes of this type are described in U.S. Patent 2,957,206. See also articles by H. P. Gregor et al. in vol. 61, Journal of Physical Chemistry, 1957 at pages 141, 151 and 197 and the pages immediately following these citations.

The membranes under consideration are porous in most fuel cell embodiments and their value for use in these fuel cell embodiments depends upon maintaining such porosity so as to admit of contact of fuel or oxidant with electrolyte and to admit of ionic transfer through the membrane. This process allows for confining the deposition of silver to the exterior membrane surface. This is made possible because the rate of the catalytic reduction process is much faster than diffusion into the membrane pores. Likewise, the catalytic reduction reaction occuring on the membrane surface, i.e. in the presence of the previously formed catalyst sites of silver, gold, platinum or palladium, is much faster than the non-catalyzed silver ion reduction in the bulk solution, i.e. that part of the treating solution not in contact with such sites. Therefore silver ion escaping into the pores with reducing agent would be reduced at a much slower rate than that on the surface and can be readily removed after the reduction process on the surface is complete. Such removal may be effected by passing an eluting agent through such pores, for example a solution of thiosulfate or concentrated iodide, chloride or cyanide solutions, etc.

Once a continuous layer of silver is formed on the membrane other materials can be electrodeposited over the silver as aforementioned. Thus, the metals known in the art for their catalytic effect when employed upon fuel cell electrodes may be superimposed upon the silver layer. When the membrane is to be used with an acid electrolyte, these would include the noble metals such as platinum, gold, iridium, rhodium, palladium, etc. and various combinations of such metals, e.g. platinum and gold, palladium and iridium, etc. When the membrane is to be used in a basic electrolyte, these would include in addition to the aforesaid noble metals those metals heretofore disclosed for use in KOH electrolyte, e.g. nickel, chromium, and various transition metals. If desired, gold, platinum, palladium or any of the more noble metals may be substituted for the silver layer on the membrane by contacting the layer of silver with an aqueous solution containing ions of such metal until a desired amount of the resulting substitution reaction occurs. This process is well known in the art.

When the membranes are employed as fuel cell electrodes, the metal and membrane combination is preferably of a thickness in the range of about 2 to 20 mils, more preferably 2 to 12 mils. The metal layer formed on the membrane surface preferably is thin enough that such layer does not substantially reduce the flexibility of the uncoated membrane. The metal layer on one side of the membrane will therefore preferably be in the range of about 0.0001 to 0.001 inch to minimize diffusion distance for fuel or oxidant to the electrolyte and to preserve flexibility. The temperature tolerance of membranes treated in accordance with this invention, particularly interpolymer membranes, is appreciably increased since the binding of the metal to the membrane, resulting from in situ reduction as hereinbefore described, permits the metal to resist to a considerable degree the tendency of the membrane to shrink upon reaching the upper limit of its temperature tolerance in the untreated state. The membranes prepared in accordance with this invention may be advantageously employed in any of the fuel cell uses to which ion-exchange membranes have been heretofore employed in the art and they may be metallized on one side only or on two opposite sides and employed as electrodes or electrolyte dividers. When the membrane does not have internal ion-exchange properties, ionic transfer between the electrodes is provided by filling the pores of the membrane with a conventional liquid electrolyte, e.g. $H_2SO_4$, KOH, etc. This additional liquid electrolyte also may be employed to equilibrate regular ion-exchange membranes in the same manner or such membranes may, when hydrated, serve as the sole electrolyte.

Representative uses of fuel cell components prepared in accordance with this invention are illustrated in the accompanying drawings.

While the foregoing description has been directed to one embodiment of this invention, namely, fuel cell components wherein the substrate covered in an organic membrane, it should be understood that other types of fuel cell electrodes may be prepared by this process where it is desired to provide a conductive surface upon a relatively non-conductive substrate or to affix a suitable metal catalyst to an electrode which is already a good electron conductor. These embodiments will be illustrated in the examples hereinafter set forth.

The accompanying drawings illustrate the novel properties of electrodes and/or electrode-electrolyte retainer combination structures of this invention with particular reference to their adaptability to design variations.

Figure 1:
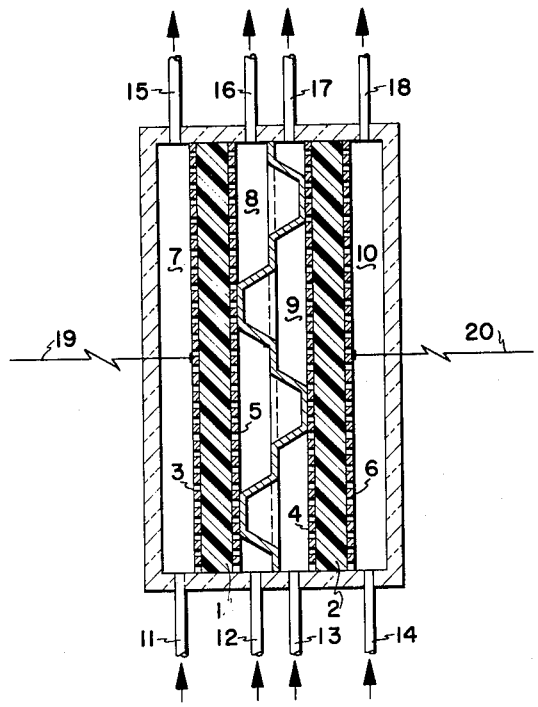
FIGURE 1 is a schematic sideview of an abbreviated cell bank showing the use of membranes prepared in accordance with this invention in two cells connected in series. It should be understood that FIGURE 1 is illustrative of a system of combining cells which would ordinarily involve a number of cells far greater than two.

Referring now to FIGURE 1, interpolymer membranes 1 and 2 prepared by dissolving linear polystyrene sulfonic acid and a copolymer of acrylonitrile and vinyl chloride in butyrolactone, casting the solution as a film and evaporating off the solvent are metal surfaced in accordance with the process of this invention so as to form anodes 3 and 4 and cathodes 5 and 6. This coating may comprise first a layer of silver laid down as before described. This layer is then contacted with an aqueous solution of gold ions, e.g. aurous thiocyanate, effecting displacement of silver with gold ions which are reduced in this exchange to gold upon the silver surface, and platinum black is electrodeposited on the resulting surface. Between membranes 1 and 2 is positioned a metal bipolar connector which separates the zone between such membranes into an oxygen receiving zone 8 and a fueling zone 9 while providing electrical contact between cathode 5 and anode 4. Fueling zone 7 communicates with anode 3 in the same manner as zone 9 with anode 4. Likewise, oxygen receiving zone 10 communicates with cathode 6 in the same manner as zone 8 with cathode 5. Conduits 11 and 13 are provided to admit a fluid combustible fuel, e.g. hydrogen, methyl alcohol, propane, butenes, hydrocarbons, etc. to fueling zones 7 and 9, respectively. Conduits 12 and 14 are provided for admitting oxygen, e.g. as air, to oxygen receiving zones 8 and 10, respectively. Conduits 15, 16, 17 and 18 are provided for exhaust outlets from compartments 7, 8, 9 and 10, respectively. Conductors 19 and 20 contact end electrodes 3 and 6 and represent leads to an external circuit not further shown. Generation of power by the cell may be carried out in accordance with conventional fuel cell operational techniques which are well known in the art and need not be further discussed here. Membranes 1 and 2 may be equilibrated with a suitable aqueous electrolyte, e.g. $H_2SO_4$.

Figure 2:
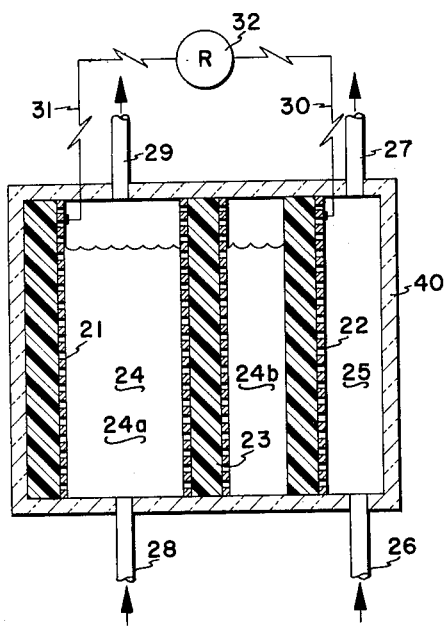
FIGURE 2 is a schematic sideview of a single cell employing a liquid electrolyte wherein membranes surfaced in accordance with this invention are employed both as an electrolyte divider and as electrodes.

In FIGURE 2, a schematic view of one cell embodiment wherein anode 21, cathode 22 and electrolyte divider 23 consist of membranes prepared in accordance with this invention, anode 21 and cathode 22 are positioned within a glass vessel 40. Cathode 22 divides vessel 40 into an electrolyte zone 24 and an oxygen receiving zone 25. Divider 23 separates electrolyte zone 24 into an anolyte zone 24A containing a liquid electrolyte, e.g. $H_2SO_4$, $H_3PO_4$, and a catholyte zone 24B. Divider 23 provides means for ionic transfer between anode 21 also containing a liquid electrolyte, e.g. $H_2SO_4$, $H_3PO_4$, $HNO_3$ or mixtures thereof, and cathode 22 while serving as a barrier to the flow of liquid carbonaceous fuels, e.g. alcohols, olefins, etc. from anolyte zone 24A to catholyte zone 24B. Inlet conduit 26 provides means for admitting oxygen, e.g. as air, to zone 25 and hence to cathode 22. Outlet conduit 27 provides an exhaust conduit from zone 25 to prevent escape of excess air, oxygen, depleted air and water vapor. Fuel inlet conduit 28 provides means for admitting an electrolyte soluble fuel, liquid or gaseous, to anolyte zone 24A. Fuel exhaust conduit 29 admits of escape of water vapor, carbon dioxide, etc. from the cell. Wires 30 and 31 are in electrical contact with electrodes 21 and 22 and represent, with resistance means 32, an external electrical circuit through which there is a net flow of electrons from anode 21 to cathode 22 when the cell is in operation. Resistance means 32 may be viewed as any device for using electrical energy generated by the electrochemical oxidation of fuel occurring within the cell, e.g. a motor, light bulb, etc., or merely an extension of wires 31 and 32.

It is to be understood that the foregoing cell designs are illustrative of only two of the many cell designs within which such membranes may be employed.

The following examples are illustrative of the process of this invention and should not be construed as limitations upon the true scope of this invention as set forth in the specification and claims.

*Example 1*

A membrane sheet having a thickness of about 4 mils and measuring about 10 x 10 inches is prepared for use in a fuel cell. The membrane employed is a cation-exchange membrane consisting essentially of sulfonated polystyrene and a non-ionic binder.

The membrane is placed in a frame and clamped in position so that the underside is in contact with water. The exposed upper surface is contacted with 150 ml. of a 0.1 normal solution of $AgNO_3$ for a few seconds to effect a surface ion exchange reaction, i.e. substitution of silver ion for hydrogen ion of the $SO_3H$ groups on the membrane surface. This solution is then drained off and the surface contacted is washed with water. This same surface is then contacted with 150 ml. of 0.19 molar hydroquinone aqueous solution which also contained 2 grams per liter of gum arabic to reduce the silver salts on the surface to elemental silver. About 2 ml. of 25% $AgNO_3$ is added to the hydroquinone solution and agitated for about 5 to 8 minutes. Silver ion is reduced upon the membrane surface resulting in the formation of a film of silver upon such surface. Tests are made of the electrical resistance across the membrane and additional silver ion added and reduced until the resistance across the surface of the membrane is reduced to about 0.014 ohm. The process is repeated upon the opposite side of the membrane. The membrane is then installed in a conventional electrodeposition bath as the cathode and platinum black is electrodeposited upon the silver surface.

The membrane is then saturated with aqueous $H_2SO_4$, electrical connection is established between the two metal coated surfaces, hydrogen gas is admitted to the metal layer formed on one side of the membrane, oxygen gas is admitted to the metal layer on the opposite side of the membrane, and an electrochemical reaction is thereby initiated as evidenced by measuring the electrical energy flowing through the aforesaid electrical connection. The cell is operated at 75° and 180° F. using first hydrogen and later ethylene as fuel.

*Example 2*

A second membrane is prepared as in Example 1 except that after silver ion is reduced in situ upon the membrane surface the electrode is contacted with an aqueous solution of auric chloride and contact maintained until the metallic silver is converted to silver ion and gold ions reduced to gold upon the membrane surface. The procedure is repeated with aurous thiocyanate with another membrane and the gold surface laid down is more uniform.

Example 3

The temperature tolerance of an uncoated interpolymer membrane is compared with an interpolymer membrane of the same composition but which has been metal surfaced in accordance with Example 1. These interpolymer membranes are prepared by dissolving linear polystyrene and a copolymer of acrylonitrile and vinyl chloride in butyrolactone, casting the solution as a film and evaporating off the solvent. After a short time, about 4 hours, the untreated membrane exhibits an area shrinkage of about 40% at 180° F. The second membrane is coated until a definite continuous film of metal is formed over the surface as evidenced by conductivity measurement. With this membrane no evidence of shrinkage is observable at 180° F. after 80 hours.

Example 4

Two polystyrene membranes are prepared in accordance with Example 1 except that prior to contact with silver ion the membrane surfaces are painted with a dye, Cochineal Red A, to make available sulfonic groups for ion exchange upon the surface. One such membrane is a non-ionic membrane consisting essentially of polystyrene and a non-ionic binder. The other is a conventional cationic sulfonic acid polystyrene membrane, i.e. linear polystyrene sulfonic acid dissolved in collodion, pyroxlyin dissolved in a mixture of diethyl ether and ethyl alcohol, the solution cast as a film and the volatile components allowed to evaporate. The process of Example 1 is then carried out and the membranes are used in a fuel cell as bath anodes, cathodes and electrolyte compartment partitions after electroplating platinum upon the silver layer.

Example 5

A membrane prepared as in Example 4 is compared with an untreated membrane by placing different liquids on opposite sides of the membranes. Observation over different periods of time establishes no noticeable difference in the amount of diffusion and hence in porosity between the treated and untreated membranes. This metallized membrane measuring 10" x 10" is folded to opposite ends into contact with each other. There is no noticeable indication of cracking or other disengagement of metal from the membrane.

Example 6

A non-ionic membrane of the composition described in Example 3 is metallized in accordance with the procedure of Example 1 leaving a layer of silver upon which is electrodeposited platinum black. The membrane is employed as the anode of an electrolytic cell. A liquid electrolyte of 0.5 molar $H_2SO_4$ is employed and the cell operated at 180° F. Electrons are admitted to the cathode from an external source of D.C. power and electrically connected to both anode and cathode, i.e. an alternating current rectifier, and butene-2 dissolved in the electrolyte is electrochemically oxidized at the surface of such anode in contact with such electrolyte and methyl ethyl ketone is recovered from the electrolyte.

Example 7

An 80 square inch interpolymer membrane is prepared by dissolving linear polystyrene sulfonic acid and a copolymer of acrylonitrile and vinyl chloride in N,N-dimethylformamide, casting the solution as a film and allowing the solvent to evaporate off. The membrane is cut into strips and one side of each strip dyed. On separate strips the following dyes are employed: Chromotrope 2R, Orange I, Orange II, Methyl Orange, Fast Red B, Crystal Ponceau 6R, Amaranth, Trypan Blue or Diamine 3B, Trypan Red, and Cotton Blue or Aniline Blue or Nicholson Blue. The respective strips are then coated with silver by the procedure of Example 1. The silver coated membranes are divided into two groups. The first group without further metallization are employed as cathodes in a fuel cell employing as the electrolyte a 6 normal aqueous solution of KOH. The remainder are exposed to an aqueous solution containing aurous chloride for 5 minutes. Platinum black is then electrodeposited upon the gold and silver layer from an aqueous solution of chloroplatinic acid. These electrodes are employed as both anodes and cathodes in cells employing aqueous electrolytes containing $H_2SO_4$, $HNO_3$ and $H_3PO_4$.

Example 8

The procedure of Example 4 is repeated with a conventional non-ionic membrane consisting essentially of linear polystyrene and a non-ionic binder except that the dyed surface is contacted with palladium chloride resulting in the formation of dispersed palladium salts upon the surface with the displacement of hydrogen ions from the ion-exchange groups on the dye. The surface is then contacted with an aqueous solution of sodium hypophosphite, nickel chloride and sodium acetate until a continuous layer of nickel is formed on the dyed surface. This coating is carried out at about 70° C. The nickel coated membrane is then employed as the fuel electrode or anode of a fuel cell using a basic electrolyte, aqueous KOH.

Example 9

A glass frit, i.e. a sintered glass cylinder having one closed end and an average pore diameter in the range of about 10 to 20 microns, is silver coated in depth, i.e. on the superficial lateral surface and on the interior pore walls in the following manner. The frit is immersed in an aqueous solution of Chromotrope 2R, i.e. about 2 grams per liter, and allowed to stand for about 10 minutes until the dye is adsorbed both on the external surfaces and on the pore walls. The excess dye is washed off and blown off with air and the frit is washed with water. The frit is then contacted with an aqueous solution of $AgNO_3$, i.e. about 0.1 molar, for about 10 minutes. The frit is then immersed in an aqueous solution of hydroquinone, i.e. abou 0.2 molar, and then contacted with an aqueous solution containing about 25 wt. percent $AgNO_3$ to which has been added water and hydroquinone until the concentration is about 0.05 molar $AgNO_3$ and about 0.1 molar hydroquinone. About 2 grams of gum arabic per liter is added to the solution and contact is maintained until a layer of silver is formed on the dyed surface. The frit is then immersed in an aqueous solution of aurous chloride, i.e. about 10 wt. percent, for about 10 minutes. Platinum black is then electrodeposited on the silver and gold layer and the frit is employed both as an oxygen electrode (cathode) and as a hydrogen electrode (anode) in a fuel cell with 30 wt. percent $H_2SO_4$ electrolyte.

Example 10

A metal catalyzed porous carbon electrode is prepared in accordance with the process hereinbefore described in the following manner. A porous carbon cylinder closed at one end is placed under a vacuum, i.e. about 20 mm. Hg, and flooded with an aqueous solution of Orange I dye. The dye is allowed to remain in the structure for about 10 minutes. The following steps are then carried out under vacuum. The excess dye is washed out of the pores, the structure is flooded with a dilute aqueous solution of $AgNO_3$ for about 10 minutes. This is removed and the structure is flooded with aqueous hydroxylamine and again washed. The structure is then flooded with a 10 wt. percent aqueous solution of $AgNO_3$ and a 0.2 molar aqueous solution of hydroxylamine. About 2 grams per liter of gum arabic is added to the reducing solution. Contact is maintained until a silver layer is continuous over the dyed area as evidenced by conductivity tests.

The structure is flooded with aqueous aurous chloride and allowed to sit 10 minutes. Platinum is then electrodeposited over the silver and gold and the structure employed as the cathode of a fuel cell.

The term "membrane" as employed herein refers to a structure which when interposed between two phases or compartments obstructs or completely prevents gross mass movement between the latter, but permits passage, with varying degrees of restriction, of one or several species of particles from the one to the other or between the two adjacent phases or compartments.

The term "electrochemical cell" as employed herein refers to an apparatus for the transformation of chemical into electrical energy or the reverse which includes a cell container, an electrolyte, and immersed in the electrolyte a cathode by which electron flow enters the cell and an anode by which electron flow leaves the cell, a transfer of ions through the electrolyte resulting between cathode and anode.

The term "fuel cell" as employed herein refers to an electrochemical cell wherein chemical energy is converted directly to electrical energy by an electrochemical (anodic) oxidation of a combustible fuel and comprises a cell container, an anode and a cathode within such container, an electrolyte providing means for ion transfer between anode and cathode, conducting means external to said electrolyte for establishing electrical connection between anode and cathode, means for admitting a combustible fuel into dual contact with anode and electrolyte and means for admitting an oxidant into dual contact with cathode and electrolyte. Where necessary or desired the electrolyte compartment is divided into an anolyte compartment and a catholyte compartment by an ion-permeable partition. Thus, in each such cell a fuel is oxidized at the anode with a release of electrons to the anode and an oxidant is reduced at the cathode upon receiving electrons from such cathode. The cathodic half-cell reaction is essentially independent of the anodic half-cell reaction aside from being a part of the same electrical circuit. The two half-cells provide a net production of electrical energy.

The term "electrolytic cell" as employed herein refers to an electrochemical cell wherein electrical energy is provided to the cathode from an outside source in contrast to a fuel cell, hereinafter defined, which generates electrical energy and is provided with both fuel and oxidant from an outside source. In the operation of such cells there is a net consumption of electrical energy. The electrodes are inert or non-sacrificial and the cells find use as electrochemical reactors for partial oxidation and other processes.

The term "ion-exchange membrane" as employed herein shall be construed to include both membranes wherein such ion-exchange groups are distributed throughout the polymeric matrix of such membrane and those wherein such groups are associated only with an outer surface of such membrane.

The term "combustible fuel" as used herein shall be understood to include hydrogen, carbon monoxide, hydrocarbons, and oxygen substituted hydrocarbons retaining at least one hydrogen atom in their molecular structure.

The term "fluid" is defined herein to mean either a liquid or a gas.

The term "equilibrate" as used herein refers to a process wherein a membrane is contacted with an external electrolyte solution for a time sufficient for the Donnan equilibrium to be attained, i.e., the ionic activity of the electrolyte in the external solution phase is equal to the activity of the same electrolyte in the membrane phase when the membrane contains a common dissociable ion.

The terms "solid materials," "solid objects," etc., include both porous and non-porous structures.

The term "relatively non-conductive" as employed herein shall be construed to mean any material or composition with a specific resistivity greater than about $10^{-4}$ ohm centimeters. Most material coated in accordance with this invention will have a specific resistivity in the range of about $10^6$ ohm centimeters or greater.

Electrodes, the basic structure of which is already a good electron conductor, can be coated by the process described using a suitable dye. However, since such materials are easily coated by electrodeposition, the need for such a process is greater with relatively non-conductive materials.

It is to be understood that the invention may be practiced with the ion-exchange groups, i.e. $-SO_3H$, $-COOH$, and $-OH$, existing as such on the surfaces to be coated, or, in the form of one of their water soluble salts, e.g. $-SO_3Na$, $-COOK$, etc.

What is claimed is:

1. In an electrochemical cell a structure which comprises in combination a solid substrate comprising a substance selected from the group consisting of a porous organic membrane, fritted glass and porous carbon and a coating comprising a continuous layer of silver formed in situ on a surface of said substrate by a process which comprises applying to said surface an organic material having chemically bonded to the molecules thereof ion-exchange groups selected from the group consisting of $-SO_3H$, $-COOH$ and $-OH$ radicals, contacting said surface for a few seconds with an aqueous solution containing silver ions thereby initiating an ion exchange reaction wherein the hydrogen component of said ion-exchange group is replaced by said metal ion thereby forming the corresponding metal salt upon said surface, reducing the metal ion of said salt by contacting said surface with a reducing agent for said ion, contacting the resulting metal comprising surface with an aqueous solution containing silver ions and a reducing agent therefor, and maintaining said contact until a continuous layer of silver is formed on said surface by reduction of silver ion in situ.

2. An electrode in an electrochemical cell prepared in accordance with claim 1 with a second metal electrodeposited over said layer.

3. An electrode in an electrochemical cell comprising a relatively non-conductive substrate comprising a substance selected from the group consisting of a porous organic membrane, fritted glass and porous carbon and a continuous layer of silver formed in situ on at least one side thereof in accordance with claim 1 with a portion of said silver replaced with a second and more noble metal by contacting said layer with an aqueous solution containing ions of said second metal.

4. An electrode in an electrochemical cell which comprises a relatively non-conductive substrate comprising a substance selected from the group consisting of a porous organic membrane, fritted glass and porous carbon and a continuous layer of a first metal selected from the group consisting of nickel and silver formed in situ on at least one surface thereof by a process which comprises applying to said surface an organic material having chemically bonded thereto a plurality of ion-exchange groups selected from the group consisting of $-SO_3H$, $-COOH$, and $-OH$ radicals, by a process which comprises contacting for a few seconds said surface with an aqueous solution containing metal ions selected from the group consisting of gold, platinum, and palladium thereby initiating an ion-exchange reaction wherein the hydrogen component of said ion-exchange group is replaced by said metal ion forming the corresponding metal salt upon said surface, reducing the metal ion component of said salt in situ to the corresponding metal upon said surface by contacting said surface with a reducing agent for said ion, contacting the resulting metal comprising surface with an aqueous solution containing ions of said first metal and a reducing agent therefor, and maintaining said contact until a continuous layer of said first metal is formed on said surface by reduction of ions of said first metal in situ upon said surface.

5. An electrode in an electrochemical cell prepared in accordance with claim 4 wherein said compound is polystyrene sulfonic acid.

6. An electrode in a fuel cell which comprises a relatively non-conductive substrate comprising a substance selected from the group consisting of a porous organic membrane, fritted glass and porous carbon and a continuous layer of a first metal selected from the group consisting of silver and nickel formed in situ on at least one surface thereof by a process which comprises adsorbing on said surface an aqueous solution containing a dye having in its molecular structure ion-exchange groups selected from the group consisting of —$SO_3H$, —COOH and —OH radicals, contacting the resulting dyed surface for a few seconds with an aqueous solution containing metal ions selected from the group consisting of gold, platinum, and palladium thereby initiating an ion-exchange reaction wherein the hydrogen component of said ion-exchange group is replaced by said metal ion forming the corresponding metal salt upon said surface, reducing the metal ion component of said salt upon said surface, reducing the metal ion component of said salt in situ to the corresponding metal upon said surface by contacting said surface with a reducing agent for said ion, contacting the resulting metal comprising surface with an aqueous solution containing ions of said first metal and a reducing agent therefor, and maintaining said contact until a continuous layer of said first metal is formed on said surface by reduction of ions of said first metal in situ.

7. An electrode in a fuel cell prepared in accordance with claim 6 wherein said dye is selected from the group consisting of Orange I, Orange II, Methyl Orange, Chromotrope 2R, Fast Red B, Crystal Ponceau 6R, Amaranth, Trypan Blue, Trypan Red, Aniline Blue and Cochineal Red A and said metal layer has a thickness in the range of about 0.0001 to 0.001 inch.

8. An electrode in a fuel cell prepared in accordance with claim 6 wherein a portion of said layer is replaced with a second and more noble metal by contacting said layer with an aqueous solution containing ions of said second metal.

9. An electrode in a fuel cell prepared in accordance with claim 8 wherein a third metal is electrodeposited over said second metal.

10. An electrode in a fuel cell prepared in accordance with claim 9 wherein said layer is silver, is formed on two separated and opposing surfaces of said base and is contacted with gold ions prior to said electrodeposition.

11. A fuel cell comprising in combination an electrolyte compartment partitioned into an anolyte zone and a catholyte zone by an ion-permeable partition, an anode communicating with said anolyte zone, a cathode communicating with said catholyte zone, a liquid anolyte in said anolyte zone, a liquid catholyte in said catholyte zone, means for admitting a fluid combustible fuel into dual contact with said anode and said anolyte, means for admitting a fluid oxidant into dual contact with said cathode and said catholyte, and conduction means establishing electrical connection between said anode and said cathode external to said electrolyte compartment, wherein said anode, said cathode and said partition each comprise in combination a relatively non-conductive substrate comprising a substance selected from the group consisting of a porous organic membrane, fritted glass and a porous carbon and a continuous layer of a first metal selected from the group consisting of silver and nickel formed in situ on at least one side of said substrate by a process which comprises adsorbing on said surface an aqueous solution containing a dye having in its molecular structure ion-exchange groups selected from the group consisting of —$SO_3H$, —COOH and —OH radicals, contacting for a few seconds the resulting dyed surface with an aqueous solution containing metal ions selected from the group consisting of gold, platinum, and palladium thereby initiating an ion-exchange reaction wherein the hydrogen component of said ion-exchange group is replaced by said metal ion forming the corresponding metal salt upon said surface, reducing the metal ion component of said salt upon said surface, reducing the metal ion component of said salt in situ to the corresponding metal upon said surface by contacting said surface with a reducing agent for said ion, contacting the resulting metal comprising surface with an aqueous solution containing ions of said first metal and a reducing agent therefor, and repeating said contact until a continuous layer of said first metal is formed on said surface by reduction of ions of said first metal in situ.

12. A fuel cell in accordance with claim 11 wherein a second metal is electrodeposited over said first metal.

References Cited by the Examiner
UNITED STATES PATENTS

| | | | |
|---|---|---|---|
| 2,283,883 | 5/1942 | Conconi | 204—137.5 |
| 2,737,541 | 3/1956 | Coolidge | 136—20 |
| 2,882,329 | 4/1959 | Liebhafsky | 136—86 |
| 2,913,511 | 11/1959 | Grubb | 136—86 |
| 3,014,976 | 12/1961 | Blackmer | 136—86 |
| 3,097,116 | 7/1963 | Moos | 136—120 |
| 3,099,608 | 7/1963 | Radovsky et al. | 204—20 |
| 3,116,170 | 12/1963 | Williams | 136—86 |

WINSTON A. DOUGLAS, *Primary Examiner.*

JOHN R. SPECK, JOHN H. MACK, *Examiners.*